Dec. 21, 1954     J. G. SUDENGA     2,697,617

FOLDABLE LATERALLY EXTENDING HITCH FOR USE WITH COMBINES

Filed Jan. 30, 1953

INVENTOR.
Jay G. Sudenga
BY
Sam J. Slotsky
ATTORNEY

United States Patent Office 2,697,617
Patented Dec. 21, 1954

2,697,617

FOLDABLE LATERALLY EXTENDING HITCH FOR USE WITH COMBINES

Jay G. Sudenga, George, Iowa

Application January 30, 1953, Serial No. 334,168

2 Claims. (Cl. 280—491)

My invention relates to a hitch.

An object of my invention is to provide a hitch which can be readily attached to a combine for the purpose of drawing a wagon alongside of the same.

A further object of my invention is to provide a hitch which can be folded upwardly so that the combine and attached hitch can pass through a gate.

A further object of my invention is to provide a hitch which can be adjusted to a shorter or longer length so that the wagon which is being drawn can be also adjustably positioned to correspond therewith according to the requirements of the combine and wagon.

A further object of my invention is to provide an adjustable collapsible arrangement wherein the hitch can be adjustably placed at selected positions when filling the wagon from the combine so that the loading of the wagon will be uniform.

A further object of my invention is to provide a latching arrangement for positioning the hitch in selected position, such latching arrangement being conveniently operated at a distance.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

My invention contemplates the provision of a hitch of the above mentioned type which can be readily shifted to several positions from the tractor seat, which can be raised upwardly for passing through a gate, and which includes adjustable features as will be explained.

I have used the character 10 to designate the extending tongue portions of a combine, which combine is adapted to draw a wagon alongside thereof, the character 11 indicating bracing, and with the character 12 indicating the wagon tongue attached to the bars 13 which are suitably secured at 14 to the tongue.

Figure 2:
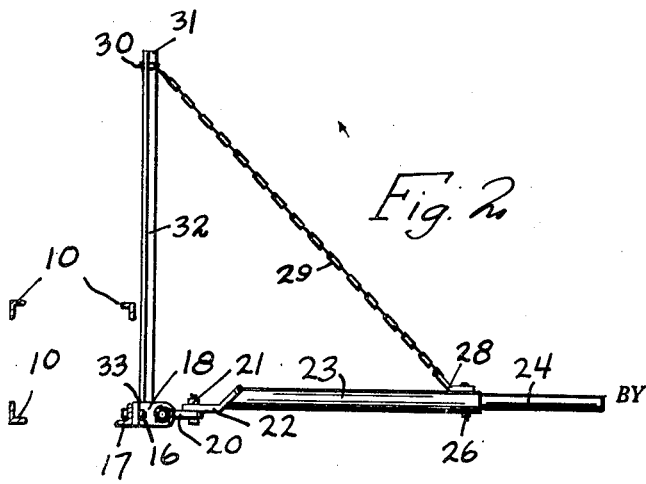
Figure 2 is a sectional view of Figure 1 taken generally along the lines 2—2 thereof.

For attaching my hitch structure to the combine tongue, I provide a pair of brackets 15 which are suitably bolted at 16 to one of the tongue angles as shown more clearly in Figure 2, this particular angle being indicated by the character 17.

Figure 1:
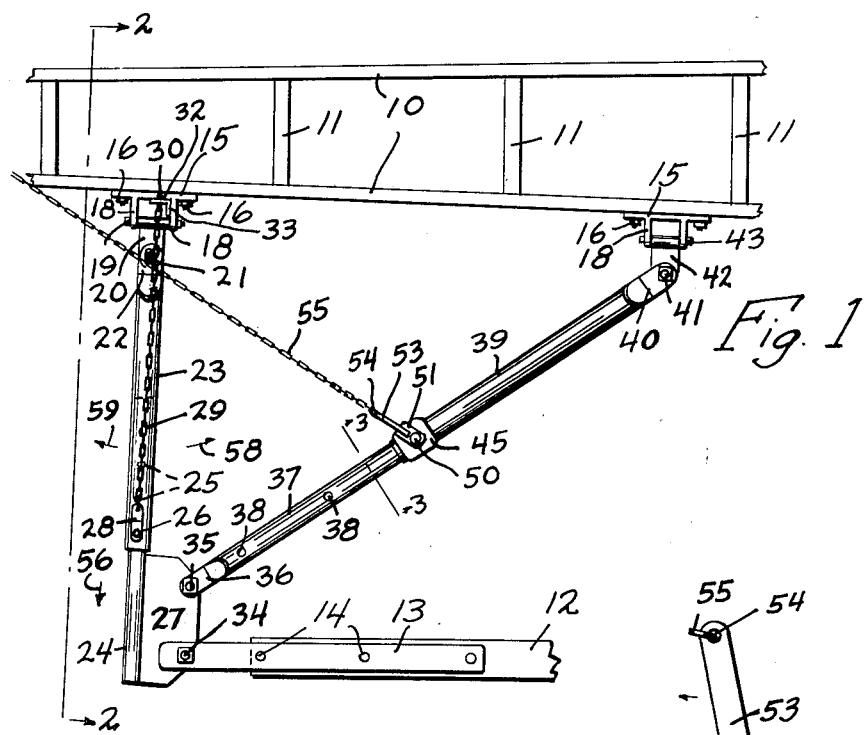
Figure 1 is a plan view of a portion of the combine tongue together with the hitch of my invention.

The brackets 15 include the extending ears 18, and pivoted between the ears 18 by means of a bolt 19 is a laterally extending further ear 20 to which is bolted at 21, for pivotal movement, a further ear 22 which is welded to a hollow female tube 23, and received in the tube 23 is a further male tube 24 having a series of openings 25 therein, the tube 24 being bolted through any of the openings 25 by means of a bolt arrangement 26, and secured to the tube 24 is a flange 27. The bolt 26 secures the short strap 28 to which is attached a chain 29, which chain is attached at 30 to the upper end 31 of an angle member 32 which is securely welded at 33 between the ears 18 of the lefthand bracket shown in Figure 1.

The strap members 13 receive the flange 27, and include suitable openings which register with a further opening in the flange 27, with a bolt and nut structure 34 passing through these openings for securing the tongue 12 to the arrangement.

The flange 27 includes a further opening for receiving a further bolt and nut structure 35 for attaching the ear 36 which is secured to a male tube 37, the tube 37 having a series of openings 38 therein, and with the tube 37 being received in a further female hollow tube 39, and attached at the end of the tube 39 is an ear member 40 which is bolted at 41 to the further ear member 42 which is suitably pivoted in the same manner as the ear 20 by means of the bolt 43 between the ears 18 of the further bracket 15.

Figure 3:
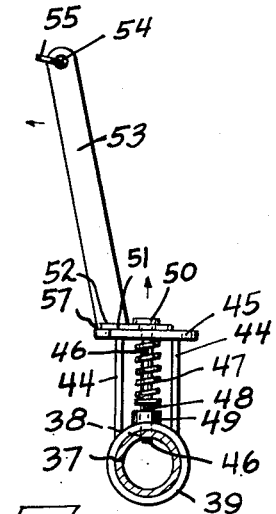
Figure 3 is a detail of the latch taken in section along the lines 3—3 of Figure 1.

Welded to the pipe 39 (see Figure 3) are a pair of vertically positioned straps or brackets 44 which are welded to a plate 45, and passing through the plate 45 is a pin 46 which is adapted to be received in any one of the openings 38, and receiving the pin 46 is a compression spring 47. Positioned beneath the compression spring 47 is a small cotter pin 48 which bears against the spring 47, the pin 46 also passing through the boss 49 which is attached to the outer pipe 39. Secured to the upper end of the pin 46 is the expanded head 50, and beneath the head 50 I provide a short bar member 51 through which the pin 46 freely passes, and welded at 52 to the member 51 is the upwardly and angularly inclined lever 53 which is attached at 54 to a suitable chain 55, which chain passes to any convenient portion of the tractor or combine.

The hitch operates in the following manner. It will be obvious that the member 24 can be brought outwardly in the direction of the arrow 56 to provide means for securing the wagon tongue at any selected distance from the combine tongue, or inwardly as shown, by merely removing the bolt 26 and inserting in any one of the openings 25.

It will also be observed that when it is desired to change the position of the wagon with respect to the discharge chute portions of the combine, that this can be readily accomplished by pulling on the chain 55, which correspondingly causes the lever member 53 to pivot at 57 against the plate 45, which in turn draws the pin 46 out of the opening 38, so that when the combine is driven forwardly, the pin will snap into the next opening 38, and in this manner, the combination of the tubes 39 and 37 by this telescoping action will permit the wagon to be placed at various positions so that the filling will be uniform, the tube 23 correspondingly swinging in the direction of the arrow 58 when moving inwardly or in the direction of the arrow 59 when moving outwardly.

For moving the device upwardly to pass through a gate, the arrangement will pivot on the bolts 19 and 43.

It will be noted that the lever member 53 can be swung around to any position in a complete circle so that the control can thus be effected where desired through the chain 55.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A hitch comprising brackets for attaching said hitch to combine portions, a laterally extending arm pivotally secured to one of said brackets, said arm including an adjustably positioned end portion whereby said arm can be lengthened, means for attaching a wagon tongue to said end portion, means secured between said other bracket and said end portion for bracing said hitch, said means including an angularly positioned member having telescoping portions, means whereby said angularly positioned member can be secured at selected positions, including a female tube, a male tube received in said female tube, a latch member, a pin operated by said latch member, said male tube having openings for receiving said pin in any selected position, said latch member including a base member spaced from said female tube and secured thereto, a short bar secured to said pin, a spring receiving said pin and bearing against said base member, an upwardly extending lever attached to said bar, a control chain attached to said lever for controlling said pin.

2. A hitch comprising brackets for attaching said hitch to combine portions, a laterally extending arm pivotally secured to one of said brackets, said arm including an adjustably positioned end portion whereby said arm can be lengthened, means for attaching a wagon tongue to said end portion, means secured between said other bracket and said end portion for bracing said hitch, said means including an angularly positioned member having telescoping portions, means whereby said angularly positioned member can be secured at selected positions, including a female tube, a male tube received in said female tube, a latch member, a pin operated by said latch member, said male tube having openings for receiving said pin in any selected position, said latch member including a base member spaced from said female tube and secured thereto, a short bar secured to said pin, a spring receiving said pin and bearing against said base member, an upwardly extending lever attached to said bar, a control chain attached to said lever for controlling said pin, said short bar being freely mounted on said pin to permit rotation of said bar for control of said pin from any angle.

References Cited in the file of this patent

UNITED STATES PATENTS

| Number | Name | Date |
|---|---|---|
| 1,941,670 | Everett | Jan. 2, 1934 |
| 1,992,429 | Hyman | Feb. 26, 1935 |
| 2,446,223 | Forney | Aug. 3, 1948 |
| 2,512,097 | Goodspeed | June 20, 1950 |